United States Patent
Martin

(10) Patent No.: US 8,684,306 B2
(45) Date of Patent: Apr. 1, 2014

(54) STEERING COLLAR LOCKING MECHANISM FOR RETRACTABLE AIRCRAFT NOSE LANDING GEAR

(75) Inventor: Dennis W. Martin, Woodinville, WA (US)

(73) Assignee: Goodrich Corporation, Charlotte, NC (US)

(*) Notice: Subject to any disclaimer, the term of this patent is extended or adjusted under 35 U.S.C. 154(b) by 620 days.

(21) Appl. No.: 12/931,229

(22) Filed: Jan. 26, 2011

(65) Prior Publication Data
US 2012/0187239 A1    Jul. 26, 2012

(51) Int. Cl.
*B64C 25/10*    (2006.01)

(52) U.S. Cl.
USPC ................ 244/102 SL; 244/102 SS

(58) Field of Classification Search
USPC ............. 244/102 SL, 102 SS, 102, 102 A
See application file for complete search history.

(56) References Cited

U.S. PATENT DOCUMENTS 4,540,142 A * 9/1985 Veaux et al. .............. 244/102 R

* cited by examiner

*Primary Examiner* — J. Woodrow Eldred
(74) *Attorney, Agent, or Firm* — Snell & Wilmer L.L.P.

(57) ABSTRACT

A retractable nose landing gear assembly for an aircraft is disclosed, which includes an elongated strut cylinder defining a longitudinal axis, an elongated strut piston mounted for reciprocal movement relative to the strut cylinder between a shrunk condition when the landing gear is retracted into a wheel well of an aircraft and a fully extended condition when the landing gear is deployed from the wheel well for landing the aircraft, and wherein the strut piston is mounted for rotation about the axis of the strut cylinder for steering the aircraft while taxiing on the ground, and a locking mechanism operatively associated with the strut cylinder for preventing rotation of the strut piston about the axis of the strut cylinder when the landing gear is in a shrunk condition retracted within the wheel well of the aircraft during flight.

18 Claims, 10 Drawing Sheets

STEERING COLLAR LOCKING MECHANISM FOR RETRACTABLE AIRCRAFT NOSE LANDING GEAR

BACKGROUND OF THE INVENTION

1. Field of the Invention

The subject invention is directed generally to retractable aircraft landing gear, and more particularly, to a locking mechanism for preventing a steering collar of a retractable nose landing gear with a shrink shock strut from rotating within the wheel well of an aircraft during flight.

2. Background of the Related Art

Retractable landing gear for aircraft are well known in the art. In general, retractable landing gears include an elongated shock strut having an upper end that is pivotally mounted to the frame of the aircraft about a retraction axis for pivotal displacement between a vertical, downwardly extending, landing and ground support position, and a horizontal, retracted position nested within a wheel well in a lower surface of the aircraft wing or fuselage.

In such landing gears, the shock strut includes telescopically disposed cylinder and piston members defining a pneumatic or hydraulic spring chamber. Pressure within the chamber biases the strut toward a telescopically extended condition. When landing or at rest on the ground, the weight of the aircraft on the landing gear compresses the strut, forcing the strut to a relatively shortened condition, which may be a number of inches shorter than the extended condition. With the aircraft airborne and the landing gears down, the unloaded gears and associated shock struts assume their fully extended position. For sustained flight, the fully extended landing gears are rotated into the retracted position to reside within the wheel wells of the aircraft.

At times, the length of a landing gear may need to be reduced to fit within the wheel well of an aircraft. In such instances a shrink mechanism may be employed to partially stroke the strut so that it can fit in the required space within the wheel well. A particularly well designed shrink shock strut is disclosed in U.S. Patent Application Publication 2010/0096499 to Luce et al., the disclosure of which is incorporated herein by reference in its entirety.

There are problems associated with introducing a shrink shock strut assembly into the nose landing gear of an aircraft. In particular, for nose landing gears, the wheels/tires are typically oriented in the centered (straight ahead) position for retraction and during landing approach. This is accomplished by a set of cams that are attached to the strut cylinder and strut piston of the shock strut. As the gear is stroked during landing, the cams disengage from one another and allow the strut to steer. When the nose landing gear is in a shrunk condition during retraction or while the aircraft is in flight, the centering cams will not be engaged. This will leave the wheels/tires free to rotate about the strut centerline within the wheel well, allowing the possibility that they could become jammed in the wheel well, which would be undesirable.

Therefore, there is a need in the art for a system that can prevent the wheels/tires of a nose landing gear assembly having a shrink shock strut, from freely rotating within the wheel well of an aircraft when the nose landing gear is in a compressed/shrunk condition, retracted within the wheel well of the aircraft.

SUMMARY OF THE INVENTION

The subject invention is directed to a retractable aircraft nose landing gear assembly with a shrink shock strut, which is adapted and configured to prevent the wheels/tires of the assembly from freely rotating within the wheel well of the aircraft when the landing gear is in a compressed/shrunk condition, retracted within the wheel well of the aircraft during flight.

The nose landing gear assembly of the subject invention includes an elongated strut cylinder defining a longitudinal axis, an elongated strut piston mounted for reciprocal movement relative to the strut cylinder between a shrunk condition when the landing gear is retracted into a wheel well of an aircraft and a fully extended condition when the landing gear is deployed from the wheel well for landing the aircraft, and wherein the strut piston is mounted for rotation about the axis of the strut cylinder for steering the aircraft while taxiing on the ground, and a locking mechanism operatively associated with the strut cylinder for preventing rotation of the strut piston about the axis of the strut cylinder when the landing gear is in a shrunk condition retracted within the wheel well of the aircraft during flight.

The nose landing gear assembly further includes a strut collar mounted for axial rotation about a lower portion of the strut cylinder. A steering linkage connects the strut collar to a lower portion of the strut piston, such that axial rotation of the strut collar relative to the strut cylinder causes corresponding axial rotation of the strut piston. Actuating means are supported by the steering plate for moving the strut collar relative to the strut cylinder to steer the aircraft while taxiing.

Preferably, the locking mechanism includes a plunger adapted and configured for hydraulically actuated movement between an unlocked condition when the landing gear is in a fully extended position deployed from the wheel well of the aircraft to permit axial rotation of the strut piston relative to the strut cylinder, and a locked condition when the landing gear is in a shrunk condition retracted within the wheel well of the aircraft to prevent axial rotation of the strut piston relative to the strut cylinder during flight.

The nose landing gear assembly also includes a steering plate fixedly supported on the strut cylinder axially adjacent to the strut collar, and the plunger is mounted on the steering plate. In addition, a clevis provided on the strut collar for receiving the plunger in the locked condition.

Preferably, the nose landing gear assembly further includes means for preventing the plunger from moving out of the locked condition when the landing gear is in a shrunk condition retracted within the wheel well during flight. In one embodiment of the subject invention, the means for preventing the plunger from moving comprises a selectively actuated valve for hydraulically isolating the plunger during flight. In another embodiment, the means for preventing the plunger from moving comprises a static abutment surface within the wheel well for blocking the plunger during flight. In yet another embodiment, the means for preventing the plunger from moving comprises a mechanical lock for internally securing the plunger in the locked condition during flight until released by an applied pressure.

In addition, a pair of lateral tire abutting rails are arranged within the wheel well for preventing rotation of the strut piston about the axis of the strut cylinder when the landing gear is in a shrunk condition retracted within the wheel well of the aircraft, in the event the plunger moves from the locked condition during flight.

These and other aspects of the nose landing gear assembly of the subject invention will become more readily apparent from the following detailed description of the preferred embodiments taken in conjunction with the drawings.

BRIEF DESCRIPTION OF THE DRAWINGS

So that those having ordinary skill in the art to which the subject invention pertains will more readily understand how to make and use the nose landing gear locking mechanism of the subject invention, preferred embodiments thereof will be described in detail hereinbelow with reference to the drawings, wherein.

DETAILED DESCRIPTION OF THE PREFERRED EMBODIMENTS

Figure 1:
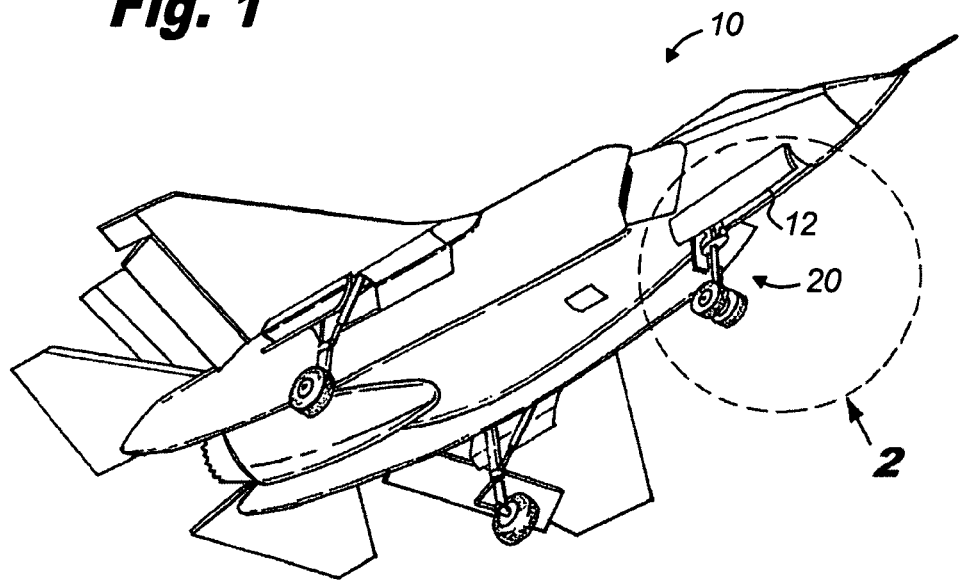
FIG. 1 is an illustration of an aircraft that employs retractable nose landing gear constructed in accordance with a preferred embodiment of the subject invention.

Referring now to the drawings wherein like reference numerals identify similar structural elements or features of the subject invention, there is illustrated in FIG. 1, an aircraft 10 employing a retractable nose landing gear assembly 20 constructed in accordance with a preferred embodiment of the subject invention. As explained in more detail below, nose landing gear assembly 20 includes a shrink shock strut of the type disclosed in U.S. Patent Application Publication 2010/0096499 to Luce et al., the disclosure of which is incorporated herein by reference in its entirety. A shrink shock strut enables the nose landing gear assembly 20 to shrink into a compact condition for efficient stowage within the wheel well 12 of aircraft 10 during flight.

Figure 2:
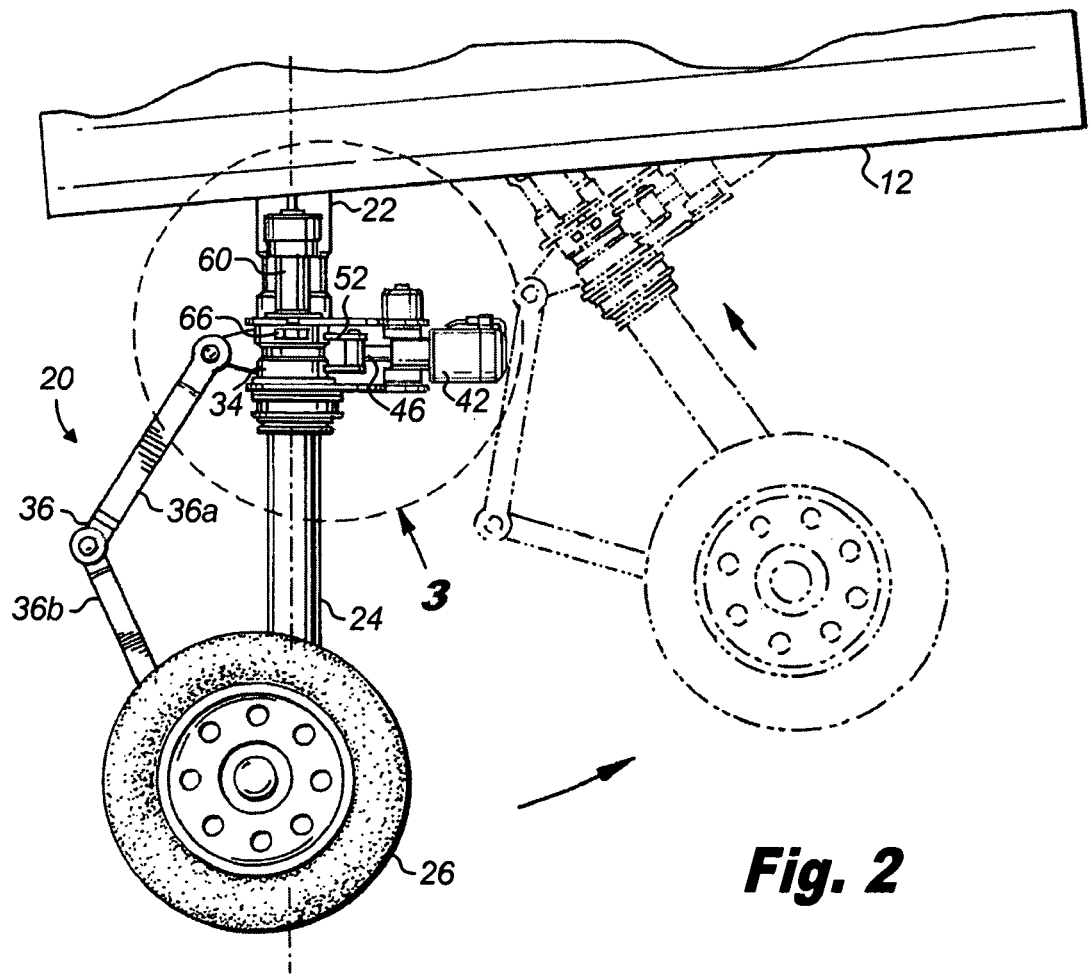
FIG. 2 is an enlarged localized view of the retractable nose landing gear shown in FIG. 1, which includes a locking mechanism for preventing rotation of the strut piston about the axis of the strut cylinder when the landing gear is in a shrunk condition retracted within the wheel well of the aircraft during flight.

Referring to FIG. 2, nose landing gear 20 includes an upper strut cylinder 22 defining a longitudinal axis and a lower strut piston 24 mounted for reciprocal and rotational movement relative to the longitudinal axis of the strut cylinder 22. Tires 26 are supported on an axle at the lower end of strut piston 24. As shown in FIG. 2, when the nose landing gear assembly 20 is retracted into the wheel well 12 of aircraft 10, the strut piston 24 transitions into a compressed condition within the strut cylinder 22. As explained in more detail below, when the nose landing gear 20 is retracted into the wheel well 12 of aircraft 10 and the strut piston 24 is in a compressed condition, the strut piston 24 can rotate off-center within the wheel well 12 as the aircraft 10 maneuvers in flight.

This off-center rotation is undesirable, because the tires 26 can move into a position in which the landing gear assembly 20 can become jammed in the wheel well 12, preventing the gear 20 from lowering out of the wheel well 12 for landing the aircraft 10. As explained in more detail below, the subject invention provides a hydraulically actuated locking mechanism that is adapted and configured to prevent the strut piston 24, and hence the wheels 26, from rotating relative to the strut cylinder 22 when the nose landing gear 20 is in a compressed or shrunk condition retracted within the wheel well 12 of the aircraft 10 during flight.

Figure 3:
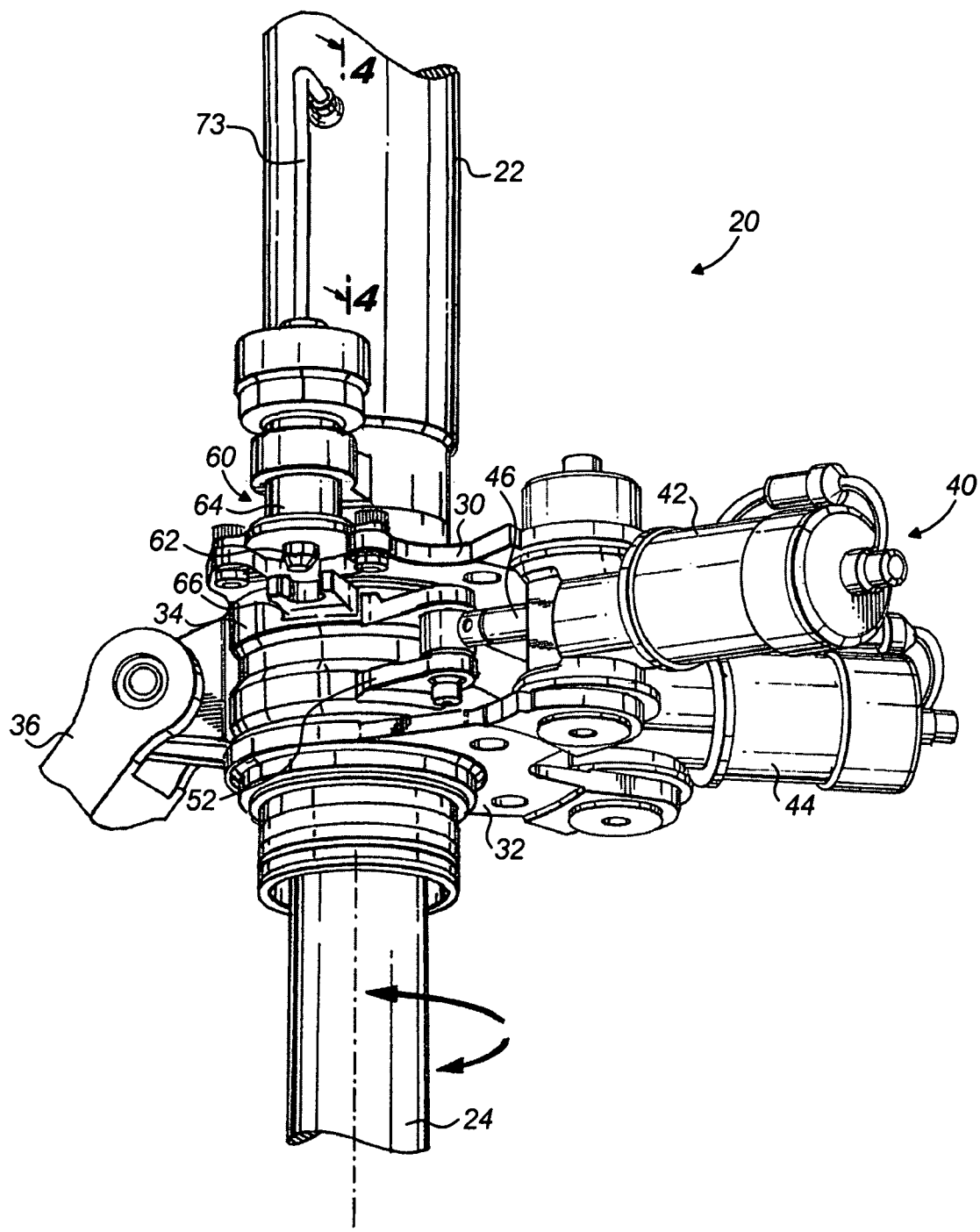
FIG. 3 is an enlarged localized view of the steering assembly of the retractable nose landing gear shown in FIG. 2, illustrating the hydraulically actuated plunger mechanism mounted on a steering plate fixedly supported on the strut cylinder axially adjacent to the strut collar, and a clevis provided on the strut collar for receiving the plunger in the locked condition.

Referring now to FIG. 3, the nose landing gear assembly 20 includes axially spaced apart upper and lower steering plates 30 and 32, which are fixedly attached to the lower portion of strut cylinder 22. A strut/steering collar 34 is positioned between the upper and lower steering plates 30, 32 and is mounted for axial rotation relative to the lower portion of the strut cylinder 22. A two-bar steering linkage 36 extends operatively between the strut collar 34 and the lower end portion of strut piston 24. More particularly, as best seen in FIG. 2, steering linkage 36 includes an upper link 36a pivotally connected to the strut collar 34 and a lower link 36b pivotally connected at one end to the upper link 36a and at the opposed end to the lower end portion of strut piston 24 adjacent the tires 26.

Referring back to FIG. 3, nose landing gear assembly 20 further includes a push-pull type actuator steering system 40 for steering aircraft 10 while taxiing. Steering system 40 includes right and left hydraulic steering actuators 42, 44 which are mounted between the upper and lower steering plates 30, 32. The actuators 42, 44 include respective actuation pistons 46 that are pivotally connected to respective clevis joints 52 on the circumference of strut collar 34. The controlled relative reciprocal movement of the actuator pistons 46 in a push-pull manner causes rotation of the strut collar 34 relative to the strut cylinder 22. Rotational motion of the strut collar 34 is transferred to the strut piston 24 through the strut linkage 36, to steer the tires 26 mounted at the lower end portion of the strut piston 24, in a manner which is known in the art.

While the nose landing gear assembly 20 has been described and illustrated as including the push-pull type actuator steering system 40, those skilled in the art will readily appreciate that alternative steering systems can be incorporated into the nose landing gear assembly 20 of the subject invention without departing from the sprit or scope of the subject disclosure. For example, it is envisioned that nose landing gear 20 could alternatively include a rack and pinion steering assembly, a rotary actuator steering assembly or a multiplying linkage steering assembly, which are all well known steering systems employed in aircraft.

With continuing reference to FIG. 3, the nose landing gear assembly 20 also includes a locking mechanism 60 that is operatively associated with the strut cylinder 22 for preventing rotation of the strut piston 24 about the axis of the strut cylinder 22 when the landing gear 20 is in a shrunk condition, retracted within the wheel well 12 of the aircraft 10 during flight. Locking mechanism 60 includes a hydraulically actuated plunger 62 disposed within an actuation housing 64. Actuation housing 64 is mounted to the upper steering plate 30, which is fixedly supported on the lower portion of strut cylinder 22. The plunger 62 cooperates with a mating surface clevis 66 extending radially outwardly from the periphery of strut collar 34, which is rotatably mounted on the lower end portion of strut cylinder 22 for steering the aircraft 10, as explained above.

Figure 4:
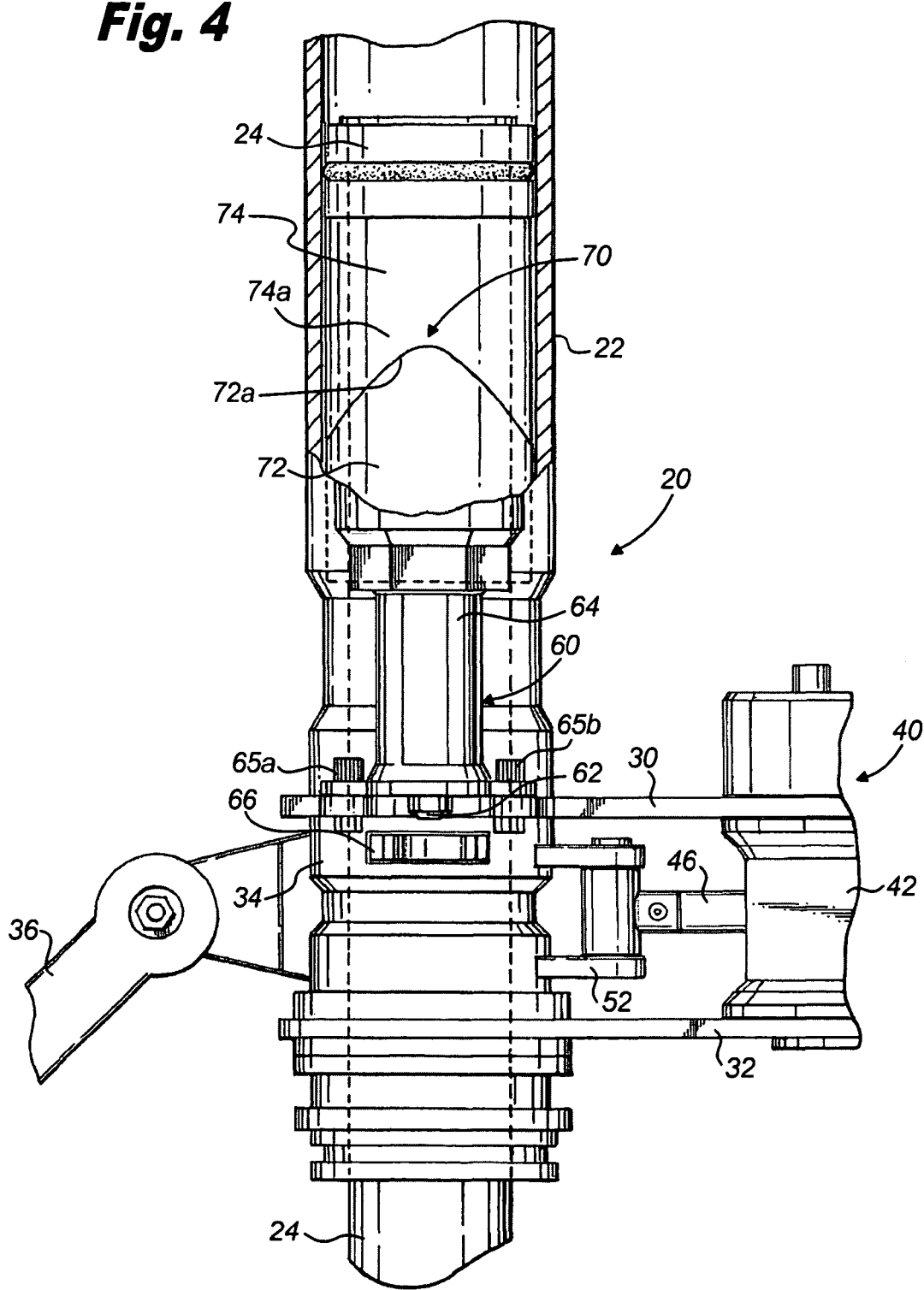
FIG. 4 is a side elevational view of the nose landing gear in an extended condition, with the strut cylinder shown in cross-section along line 4-4 of FIG. 3 to illustrate the engagement of the centering cam surfaces, and showing the plunger in a disengaged position relative to the clevis.

As shown in FIG. 4, when the nose landing gear 20 is in an extended condition for landing, take-off or taxiing, the plunger 62 of locking mechanism 60 is in an unlocked condition with respect to clevis 66, retracted within actuation housing 64. At such a time, the centering cam 70 of landing gear assembly 20 is in an engaged condition, to center the strut piston 24 with respect to the strut cylinder 22. More particularly, the lower cam surface 72a of the cam follower 72, which is keyed to the interior of the lower portion of strut cylinder 22, and the upper cam surface 74a of the centering cam 74, which is keyed to the exterior of the upper portion of strut piston 24 within strut cylinder 22, are intimately engaged with one another.

Figure 5:
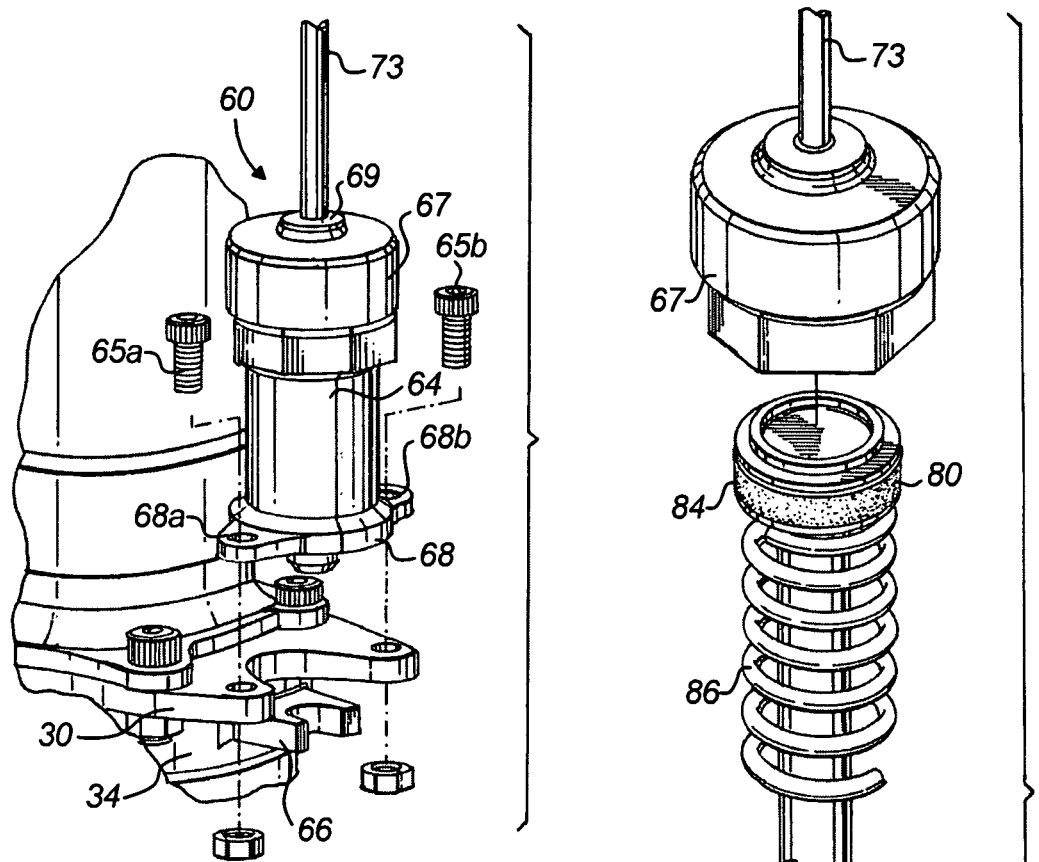
FIG. 5 is a localized perspective view of the plunger assembly separated from the mounting area on the steering plate.
Figure 6:
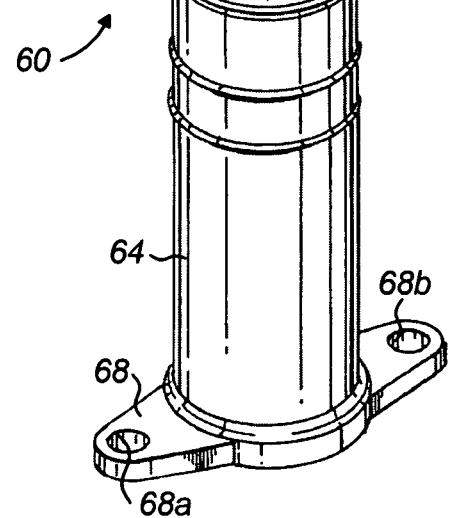
FIG. 6 is an exploded perspective view of the plunger assembly, with parts separated for ease of illustration.

Referring now to FIGS. 5 and 6, the actuation housing 64 of locking mechanism 60 defines a pressure chamber 63 and includes an end cap 67 for enclosing the chamber 63. End cap 67 defines a fitting 69 for communicating with a hydraulic fluid conduit 73, which receives hydraulic fluid from the aircraft hydraulic supply by way of the landing gear hydraulic supply. Actuation housing 64 also includes a lower mounting flange 68 having diametrically opposed apertures 68a, 68b for receiving threaded fastener 65a, 65b that secure the actuation housing 64 to the upper steering plate 30 so that plunger 62 is aligned with clevis 66.

As best seen in FIG. 6, the head 80 of plunger 62 is sealingly supported within the pressure chamber 63 of actuation housing 64 by an annular seal 84, and it is normally biased into an unlocked condition by a coiled biasing spring 86. Moreover, when hydraulic pressure is not applied to the head 80 of plunger 62 through hydraulic feed line 73, the spring 86 urges the plunger 62 into a retracted position within housing 64. However, when hydraulic pressure is applied to the head 80 of the piston 62, the bias of coil spring 86 is overcome, and the plunger 62 is moved into a locked condition with respect to clevis 66, as shown previously for example in FIG. 7.

Figure 7:
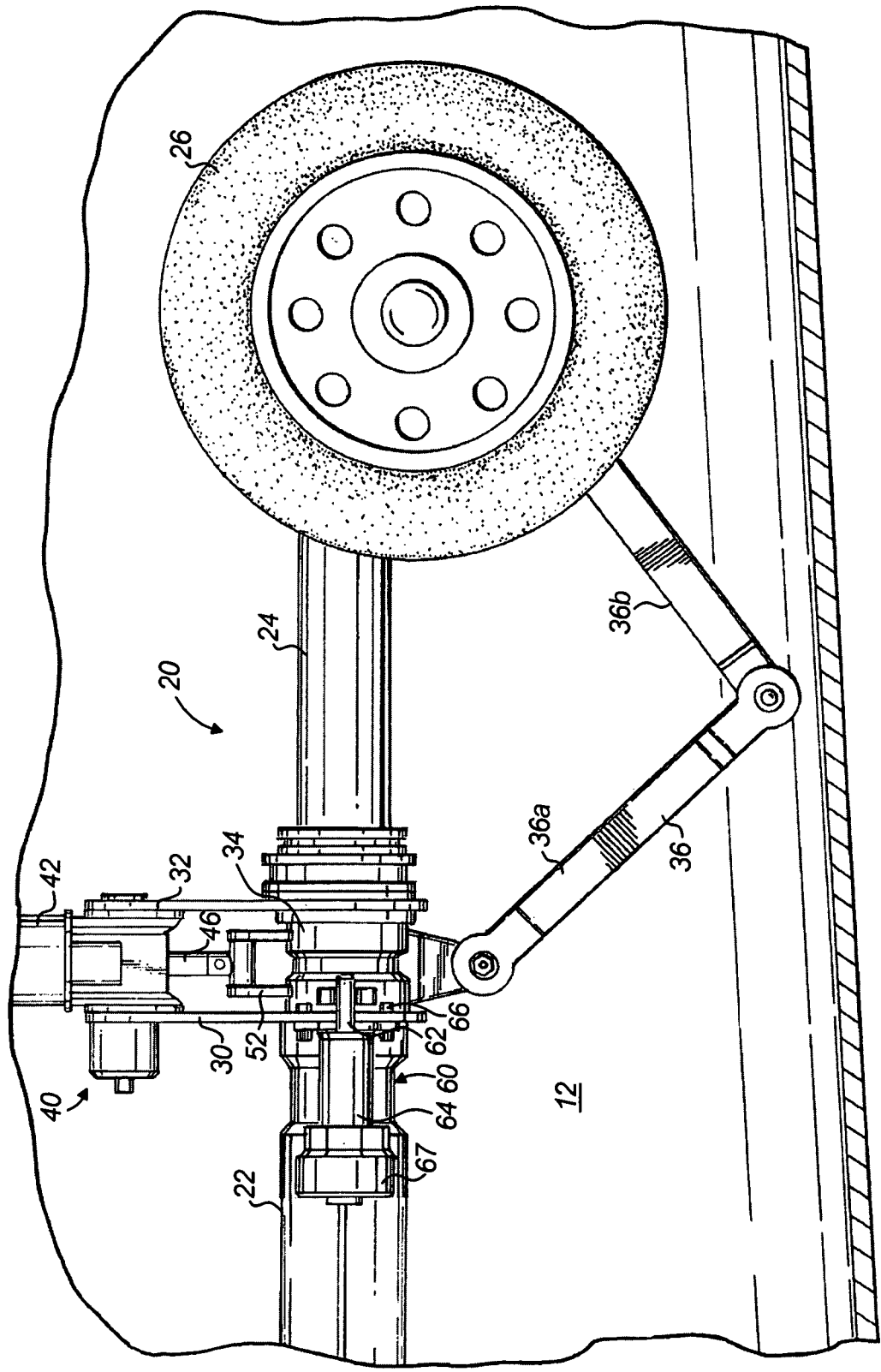
FIG. 7 is a side elevational view of the nose landing gear of the subject invention retracted within the wheel well of the aircraft, with the plunger in a locked condition received by the clevis.

Referring now to FIG. 7, prior to the nose landing gear assembly 20 being compressed/shrunk and retracted within the wheel well 12 of aircraft 10, the plunger 62 is hydraulically moved (either automatically or by command) to a locked condition received by the clevis 66. Once the plunger 62 is in a locked position with respect to clevis 66, the rotatable/angular position of the strut collar 34 with respect to the lower end of strut cylinder 22 is fixed. Accordingly, the strut cylinder 22, which is connected to the strut collar 34 through strut linkage 36, is rotational/angular fixed. Furthermore, the strut piston 24, which is connected to the strut linkage 36, is unable to rotate about the axis of the strut cylinder 22. Consequently, the tires 26 are prevented from rotating off-center and becoming jammed in the wheel well 12 of aircraft 10 during retraction.

Figure 8:
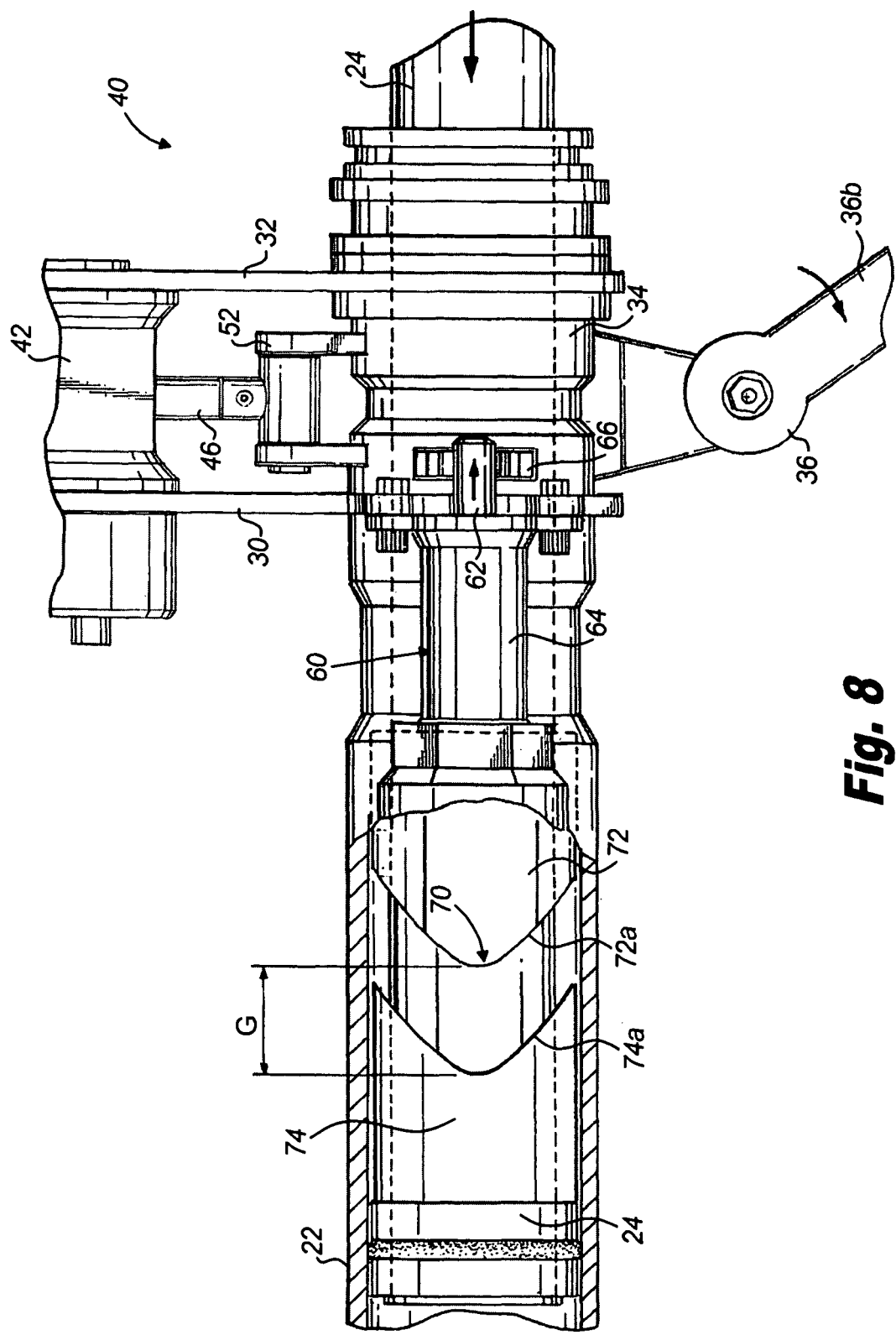
FIG. 8 is an enlarged localized view of the landing gear assembly in a retracted position, as shown in FIG. 7, wherein the strut cylinder is in cross-section to show the centering cam surfaces spaced apart from one another, which would otherwise permit the strut piston to rotate relative to the strut cylinder in the absence of the engagement of the plunger with the clevis.

Referring to FIG. 8, when the nose landing gear assembly 20 is in a compressed/shrunk condition, retracted within the wheel well 12 of aircraft 10, the centering cam assembly 70 of landing gear assembly 20 is in a disengaged condition. More particularly, the lower cam surface 72a of cam follower 72 and the upper cam surface 74a of centering cam 74 are axially spaced apart from one another, forming a gap "G" therebetween. This is because the strut piston 24 is compressed within the strut cylinder 22, causing the cam centering cam 74 keyed to the strut piston 24 from moving away from the cam follower 72 keyed to the strut cylinder 22. Consequently, in the absence of the locking mechanism 60 of the subject invention (i.e., the engagement of plunger 62 in clevis 66), the strut piston 24 would otherwise be free to rotate relative to the strut cylinder 22 when the landing gear 20 is retracted within wheel well 12 of aircraft 10.

Those skilled in the art will readily appreciate that hydraulic systems are susceptible to failure. Consequently, the locking mechanism of the subject invention is adapted and configured to remain in a locked position in the event the hydraulics associated with the nose landing gear assembly 20 fail while the aircraft 10 is in flight. FIGS. 9 through 12 illustrate various ways in which this is accomplished.

Figure 9:
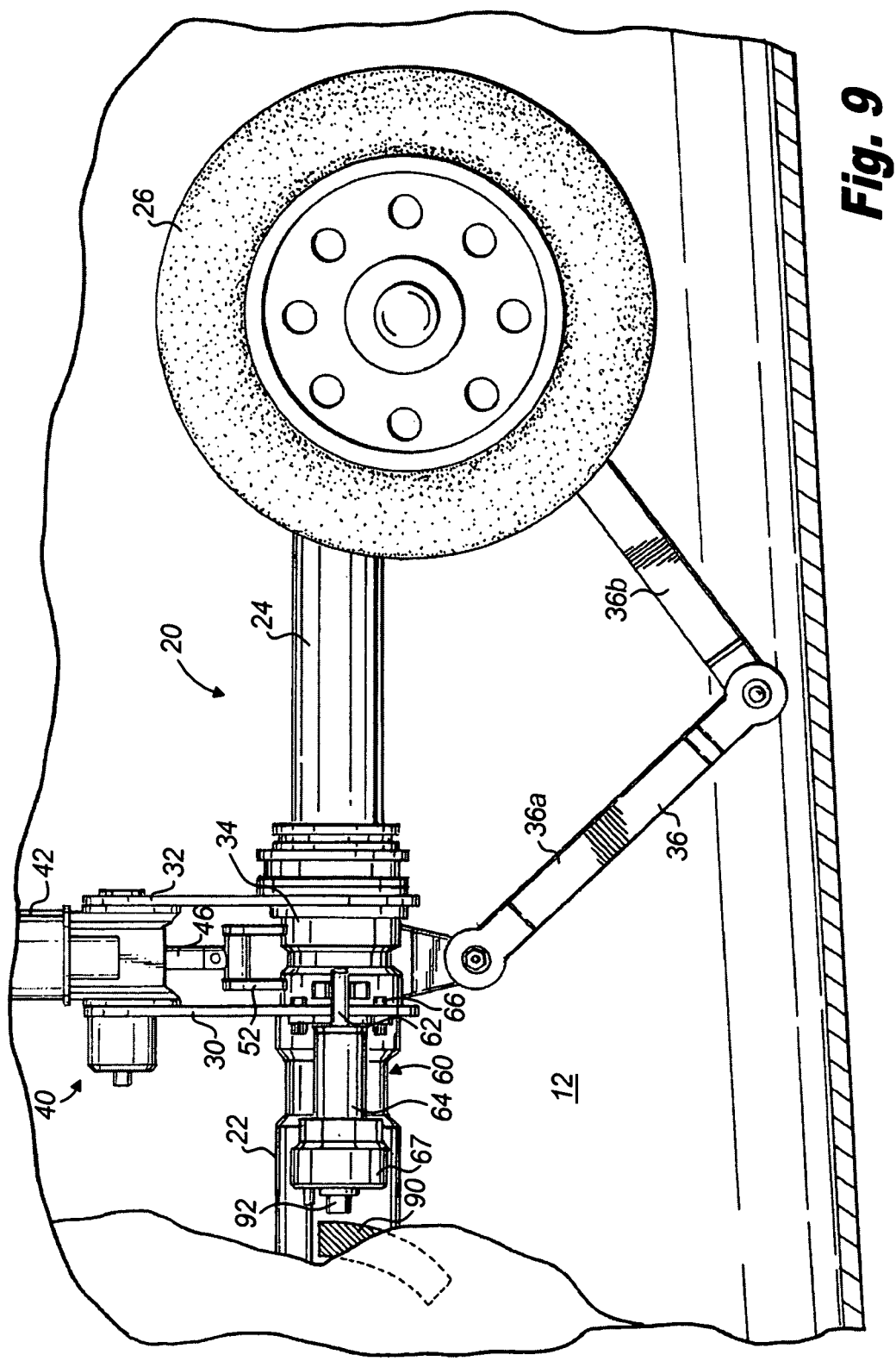
FIG. 9 is a side elevational view of the landing gear of the subject invention retracted within the wheel well of the aircraft, wherein a static abutment surface is located within the wheel well blocking the plunger during flight to prevent it from moving from its locked condition.

In one embodiment of the subject invention shown in FIG. 9, there is an arcuate static abutment arm 90 located within the wheel well 12 for blocking the plunger 62 from retracting under the bias of spring 86, in the event of a hydraulic failure in the landing gear assembly 20 while aircraft 10 is in flight. More particularly, in this alternative embodiment of the subject invention, the plunger 62 includes a rearwardly extending protrusion 92, which extends from the end cap 67 of the actuation housing 64 and which comes into close contact with the arcuate abutment arm 90 when the landing gear 20 is retracted into wheel well 12. Contact between the rear protrusion 92 of the plunger 62 and the static abutment surface 90 will only occur when a failure of the hydraulic system is such that the plunger 62 of the locking mechanism 60 wants to return to the normally biased position by means of spring 86. Thus, the plunger 62 will remain engaged with the clevis 66 until the landing gear 20 is extended from the wheel well 12, whereby the rear protrusion 92 of the plunger 62 will move away from the static abutment surface 90, after the wheels 26 are free from the wheel well 12, permitting the plunger 62 to move to an unlocked position, disengaged from clevis 66. There is sufficient clearance between the abutment arm 90 and protrusion 92 to prevent frictional contact therebetween during landing gear cycling.

Figure 10:
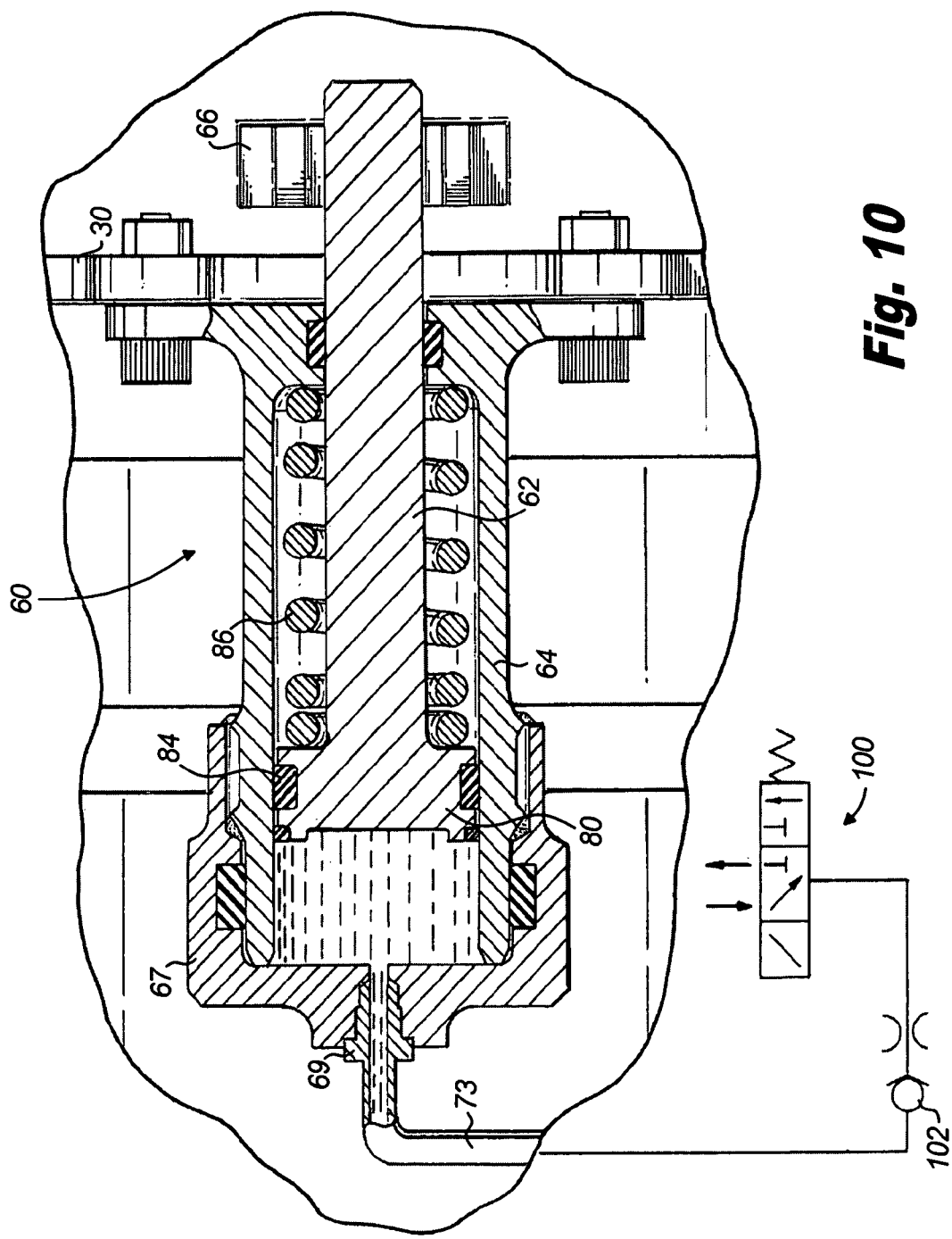
FIG. 10 is a cross-sectional view of the plunger assembly in a locked condition, illustrating a selectively actuated valve for hydraulically isolating the plunger during flight to prevent the plunger from moving from its locked condition.

In another embodiment of the subject invention shown in FIG. 10, the locking mechanism 60 includes a pilot actuated selector valve assembly 100 for selectively isolating the actuation housing 64 during flight, to prevent the plunger 62 from moving from its locked condition in the event of a hydraulic failure within landing gear assembly 20. More particularly, when valve assembly 100 is selectively closed, the housing 64 is hydraulically locked, preventing pressure from escaping through a pilot operated check valve 102. Thus, plunger 62 is hydraulically locked in place. When the valve assembly 100 is in an open position, pressure flows from the housing through the pilot operated check valve 102, permitting plunger 62 to retract under the bias of coiled spring 86.

Figure 11:
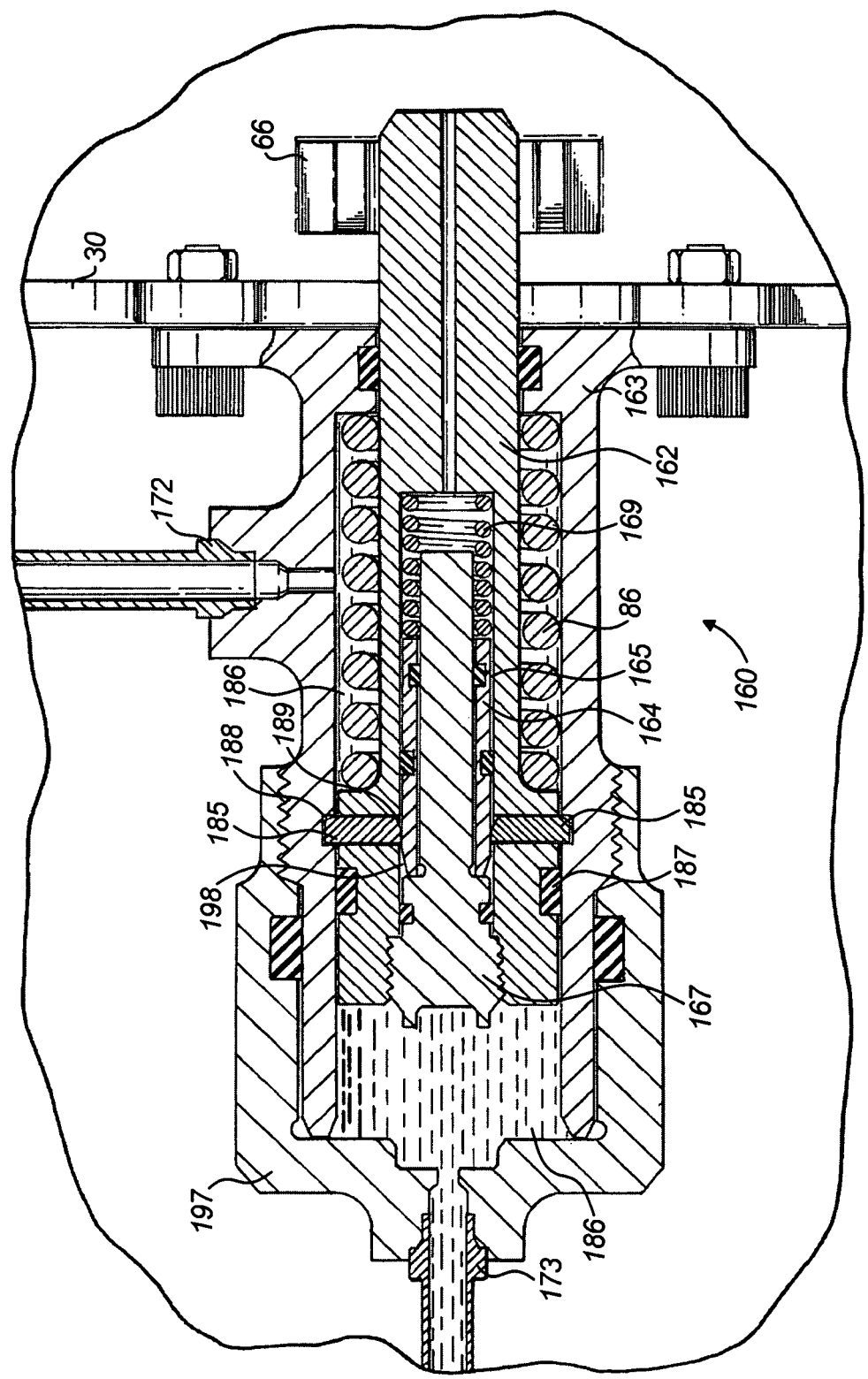
FIG. 11 is a cross-sectional view of an alternative embodiment of the plunger assembly in a locked condition, which includes a mechanical lock for internally securing the plunger in the locked condition during flight until it is released by an applied pressure.

Another embodiment of the subject invention is illustrated in FIG. 11 and designated generally by reference numeral 160. Locking mechanism 160 includes a compound plunger 162 disposed within a dual ported actuation housing 163. An elongated floating piston 164 is sealingly retained within the central bore 165 of plunger 162 by a threaded pin 167. The floating piston 164 surrounds the elongated body of pin 167 within bore 165, and the piston 164 is dimensioned for axial movement relative to the pin 167. A coiled locking spring 169 is also disposed within the central bore 165 of plunger 162 and it too is retained by pin 167. Spring 169 is adapted to internally secure the floating piston 164, and hence the segmented locks 185, in the locked condition during flight until it is released by an applied hydraulic pressure, as explained more fully below. Those skilled in the art will recognize this concept as a self-locking actuator.

With continuing reference to FIG. 11, locking mechanism 160 further includes a first pressure port 172 provided on the side of actuation housing 163 for admitting hydraulic fluid into the bore 186 of housing 163, to control the movement of floating piston 164 relative to pin 167 and spring 169. More particularly, hydraulic fluid admitted through port 172 is directed into the central bore 165 of plunger 162 through passages in the plunger 162 that are not shown in FIG. 11. A second pressure port 173 is associated with the end cap 197 of actuation housing 163 for admitting hydraulic fluid into the bore 186 of housing 163 above seal ring 187, to control the overall movement of compound plunger 162 within the bore 186 of housing 163.

In addition, locking mechanism 160 includes a plurality of circumferentially arranged locking segments 185 which cooperate with a radial locking groove 188 formed in the bore 186 of actuation housing 163 below seal ring 187, to retain the plunger 162 in a locked position during flight. The locking segments 185 each include respective radially inner chamfered surfaces 189 for interacting with a chamfered annular surface 198 on the upper shoulder of floating piston 164.

In operation, when it is desirable to release the compound piston 162 to deploy landing gear assembly 20 from wheel well 12, pressure is selectively applied at the side pressure port 172 so that hydraulic fluid flows into the central bore 165 of plunger 162. As a result, the floating piston 164 is urged against locking spring 169, which is thereby compressed within the central bore 165 of piston 162. As the shoulder 198 of floating piston 164 moves past the locking segments 185, the locking segments 185 move radially inward into the space vacated by the piston 164 under the hydraulic pressure within bore 186. Thus, the segment locks 185 disengage from the radial locking groove 188 in the bore 186. Consequently, the plunger 162 is released and can freely retract under the bias of coiled spring 86 and the bias of hydraulic pressure from port 172, disengaging the plunger 162 from clevis 66.

Figure 12:
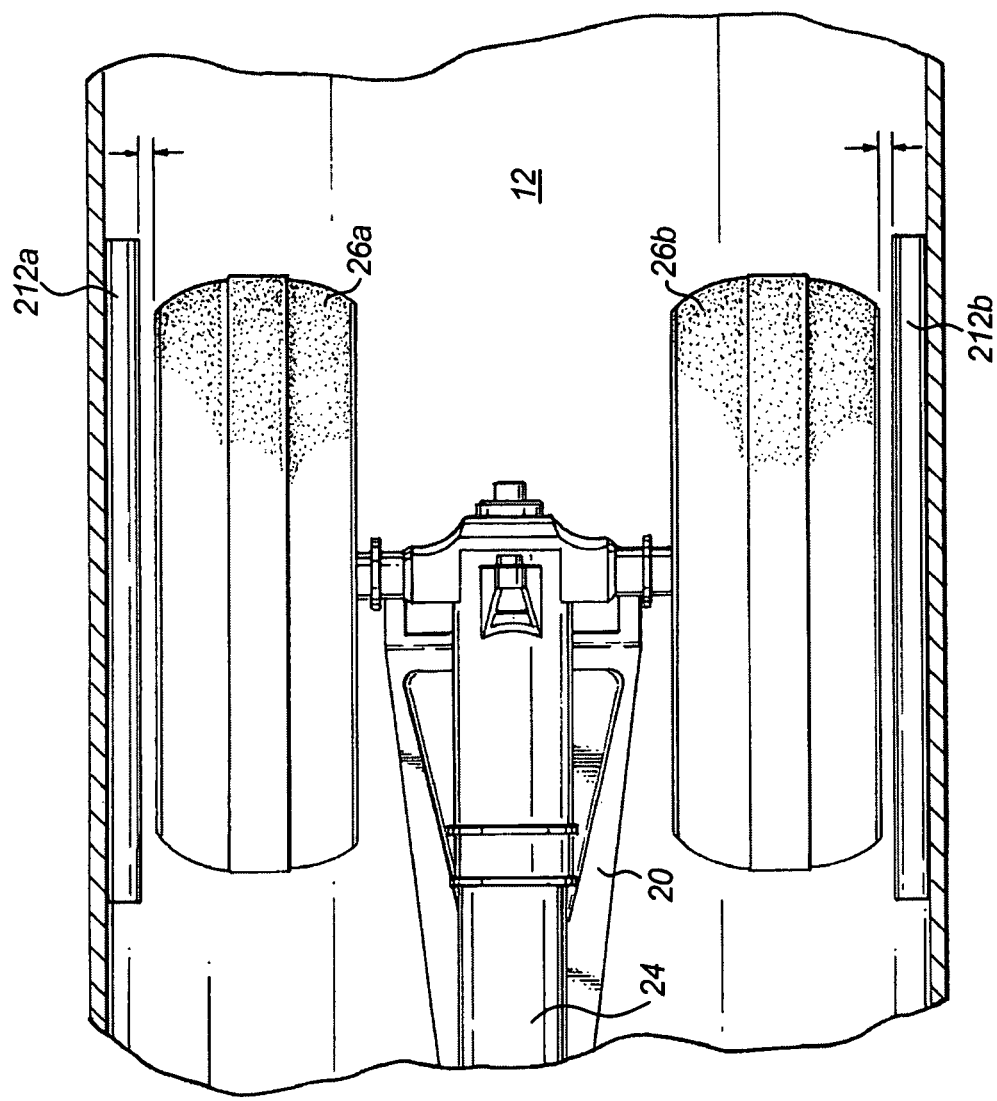
FIG. 12 is plan view of the nose landing gear of the subject invention, retracted within the wheel well of the aircraft, wherein a pair of lateral tire abutting rails are arranged within the wheel well for preventing rotation of the strut piston about the axis of the strut cylinder when the landing gear is in a shrunk condition, in the event the plunger moves from the locked condition during flight.

Referring now to FIG. 12, in accordance with another embodiment of the subject invention, a pair of lateral tire abutting rails 212a, 212b are arranged within the wheel well 12 of aircraft 10 for preventing rotation of the strut piston 24 about the axis of the strut cylinder 22 when the nose landing gear assembly 20 is in a shrunk condition, retracted within the wheel well 12. Consequently, in the event the plunger 62 moves from the locked condition during flight as a result of a hydraulic failure within the landing gear assembly 20, the tires 26a, 26b will be prevented from becoming jammed in the wheel well 12. preferably, there is sufficient clearance between the tires 26a, 26b and the rails 212a, 212b, so that the rails do not frictional interfere with tires during normal landing gear cycling.

While the subject invention has been described with respect to preferred and exemplary embodiments, those skilled in the art will readily appreciate that various changes and/or modifications can be made to the invention without departing from the spirit or scope of the invention as described herein.

What is claimed is:

1. A retractable nose landing gear assembly for an aircraft, comprising:
   a) an elongated strut cylinder defining a longitudinal axis;
   b) an elongated strut piston mounted for reciprocal movement relative to the strut cylinder between a shrunk condition when the landing gear is retracted into a wheel well of an aircraft and a fully extended condition when the landing gear is deployed from the wheel well for landing the aircraft, and wherein the strut piston is mounted for rotation about the axis of the strut cylinder for steering the aircraft while taxiing on the ground; and
   c) a locking mechanism operatively associated with the strut cylinder for preventing rotation of the strut piston about the axis of the strut cylinder when the landing gear is in a shrunk condition retracted within the wheel well of the aircraft during flight,
   wherein the locking mechanism includes a plunger adapted and configured for hydraulically actuated movement between an unlocked condition when the landing gear is in fully extended position deployed from the wheel well of the aircraft to permit axial rotation of the strut piston relative to the strut cylinder, and a locked condition when the landing gear is in a shrunk condition retracted within the wheel well of the aircraft to prevent axial rotation of the strut piston relative to the strut cylinder during flight; and
   a clevis provided on a strut collar for receiving the plunger in the locked condition.

2. A retractable nose landing gear assembly as recited in claim 1, further comprising a strut collar mounted for axial rotation about a lower portion of the strut cylinder.

3. A retractable nose landing gear assembly as recited in claim 2, further comprising a steering linkage connecting the strut collar to a lower portion of the strut piston, such that axial rotation of the strut collar relative to the strut cylinder causes corresponding axial rotation of the strut piston.

4. A retractable nose landing gear assembly as recited in claim 1, further comprising a steering plate fixedly supported on the strut cylinder axially adjacent to the strut collar, wherein the plunger is mounted on the steering plate.

5. A retractable nose landing gear assembly as recited in claim 1, further comprising means for preventing the plunger from moving out of the locked condition when the landing gear is gear is in a shrunk condition retracted within the wheel well during flight.

6. A retractable nose landing gear assembly as recited in claim 5, wherein the means for preventing the plunger from moving comprises a selectively actuated valve for hydraulically isolating the plunger during flight.

7. A retractable nose landing gear assembly as recited in claim 5, wherein the means for preventing the plunger from moving comprises a static abutment surface within the wheel well for blocking the plunger during flight.

8. A retractable nose landing gear assembly as recited in claim 5, wherein the means for preventing the plunger from moving comprises a mechanical lock for internally securing the plunger in the locked condition during flight until released by an applied pressure.

9. A retractable nose landing gear assembly as recited in claim 1, further comprising a pair of lateral tire abutting rails arranged within the wheel well for preventing rotation of the strut piston about the axis of the strut cylinder when the landing gear is in a shrunk condition retracted within the wheel well of the aircraft, in the event the plunger moves from the locked condition during flight.

10. A retractable nose landing gear assembly as recited in claim 4, further comprising actuating means supported by the steering plate for moving the steering collar relative to the strut cylinder to steer the aircraft while taxiing.

11. A retractable nose landing gear assembly for an aircraft, comprising:
   a) an elongated strut cylinder defining a longitudinal axis;
   b) an elongated strut piston mounted for reciprocal movement relative to the strut cylinder between a shrunk condition when the landing gear is retracted into a wheel well of an aircraft and a fully extended condition When the landing gear is deployed from the wheel well for landing the aircraft, and wherein the strut piston is mounted for rotational movement relative to the longitudinal axis of the strut cylinder for steering the aircraft while taxiing on the ground;
   c) at least one steering plate fixedly supported on the strut cylinder;
   d) a strut collar rotationally mounted on a lower portion of the strut cylinder axially adjacent to a steering plate;
   e) a steering linkage connecting the strut collar to a transverse wheel axle mounted to a lower end portion of the strut piston for rotatably supporting at least one wheel, such that axial rotation of the strut collar relative to the strut cylinder causes corresponding rotation of the wheel axle to steer the aircraft on the ground;
   f) a clevis provided on the strut collar; and
   g) a plunger supported on the steering plate, which is adapted and configured for hydraulically actuated movement between a first position spaced from the clevis when the landing gear is in a fully extended position deployed from the wheel well of the aircraft to permit relative rotation of the strut piston and strut cylinder and a second position engaged with the clevis to prevent rotational movement of the strut piston relative to the strut cylinder when the landing gear is in a shrunk condition retracted within the wheel well of the aircraft during flight.

12. A retractable nose landing gear assembly as recited in claim 11, wherein the strut collar is disposed between upper and lower axially spaced apart steering plates.

13. A retractable nose landing gear assembly as recited in claim 12, wherein the plunger is supported on the upper steering plate.

14. A retractable nose landing gear assembly as recited in claim 11, wherein the plunger is normally biased into the first position by a coiled biasing spring.

15. A retractable nose landing gear assembly as recited in claim 11, further comprising actuating means supported by the at least one steering plates for moving the steering collar relative to the strut cylinder to steer the aircraft while taxiing.

16. A retractable nose landing gear assembly as recited in claim 11, wherein a cam follower is keyed to the strut cylinder and a centering cam is keyed to the strut piston, and wherein the cam follower and centering cam are separated from one another when the landing gear is in a shrunk condition and are engaged with another when the landing gear is in a fully extended condition.

17. A retractable nose landing gear assembly as recited in claim 11, further comprising means for preventing the plunger from moving out of the locked condition when the landing gear is in a shrunk condition retracted within the wheel well during flight.

18. A retractable nose landing gear assembly as recited in claim 17, further comprising a pair of lateral tire abutting rails arranged within the wheel well for preventing rotation of the strut piston about the axis of the strut cylinder when the landing gear is in a shrunk condition retracted within the wheel well of the aircraft, in the event the plunger moves from the locked condition during flight.

* * * * *